US00RE47317E

(19) United States
(12) Reissued Patent
Sill et al.

(10) Patent Number: US RE47,317 E
(45) Date of Reissued Patent: Mar. 26, 2019

(54) BAG RACK AND DISPENSING SYSTEM AND METHOD FOR PACKAGING AND DISPENSING ITEMS

(71) Applicant: Inno-Pak, LLC, Delaware, OH (US)

(72) Inventors: Jonathan D. Sill, Powell, OH (US); Christopher T. Sill, Westerville, OH (US)

(73) Assignee: Inno-Pak, LLC, Delaware, OH (US)

(21) Appl. No.: 15/460,362

(22) Filed: Mar. 16, 2017

Related U.S. Patent Documents

Reissue of:
(64) Patent No.: 9,511,889
Issued: Dec. 6, 2016
Appl. No.: 15/204,405
Filed: Jul. 7, 2016

U.S. Applications:
(63) Continuation of application No. 13/870,258, filed on Apr. 25, 2013, now Pat. No. 9,415,886.

(51) Int. Cl.

| | |
|---|---|
| ***A47G 29/00*** | (2006.01) |
| ***B65D 33/14*** | (2006.01) |
| ***B65D 33/06*** | (2006.01) |
| ***B65D 33/16*** | (2006.01) |
| ***A47F 5/00*** | (2006.01) |

(Continued)

(52) U.S. Cl.
CPC ..... *B65B 67/1266* (2013.01); *A47F 5/0006* (2013.01); *A47F 5/01* (2013.01); *A47F 9/042* (2013.01); *A47F 13/085* (2013.01); *B65B 5/045* (2013.01); *B65B 7/02* (2013.01); *B65B 67/1227* (2013.01); *B65B 67/1255* (2013.01);
(Continued)

(58) Field of Classification Search
CPC . B65B 67/12; B65B 67/1222; B65B 67/1227; B65B 67/1233; B65B 67/1255; B65B 67/1266; B65B 67/1294; A47F 5/01; A47F 5/0006; A47F 9/042; A47F 13/085; B65D 33/06; B65D 33/001; B65D 33/007; B65D 33/008; B65D 33/065
See application file for complete search history.

(56) References Cited

U.S. PATENT DOCUMENTS 2,682,956 A 7/1954 Pike
2,891,676 A 6/1959 Miller
(Continued)

FOREIGN PATENT DOCUMENTS

DE 1844267 * 9/1961

*Primary Examiner* — Patricia L Engle
(74) *Attorney, Agent, or Firm* — Ward and Smith, P.A.; Ryan K. Simmons

(57) ABSTRACT

A bag rack and dispensing system and method of packaging and dispensing items, such as food. The bag rack and dispensing system includes a rack that is formed of a base assembly and a hanger assembly on which multiple storage bags can be hung. A method of using the bag rack and dispensing system for packaging and dispensing food items includes, but is not limited to, the steps of hanging the storage bags on the rack of the bag rack and dispensing system, opening the frontmost storage bag, holding open or propping open the storage bag using a hooking device, placing the food item(s) or any other types of item(s) into the storage bag, removing the hooking device, if used, closing the storage bag, and removing the filled storage bag from the rack of the bag rack and dispensing system.

18 Claims, 11 Drawing Sheets

(51) Int. Cl.

| | |
|---|---|
| ***A47F 13/08*** | (2006.01) |
| ***A47F 5/01*** | (2006.01) |
| ***B65B 7/02*** | (2006.01) |
| ***B65D 33/00*** | (2006.01) |
| ***B42F 17/00*** | (2006.01) |
| ***A47F 5/14*** | (2006.01) |
| ***B65B 67/12*** | (2006.01) |
| ***A47F 9/04*** | (2006.01) |
| ***B65B 5/04*** | (2006.01) |

(52) U.S. Cl.
CPC ..... *B65D 33/001* (2013.01); *B65D 33/06* (2013.01); *B65D 33/14* (2013.01); *B65D 33/16* (2013.01)

(56) References Cited

U.S. PATENT DOCUMENTS 3,055,508 A 9/1962 Reever
3,180,557 A * 4/1965 Thulin ..... B65D 31/10 383/18
3,200,959 A 8/1965 Theim
3,334,766 A 8/1967 Rogus
3,514,015 A * 5/1970 Hein ..... A47F 1/04 211/51
3,759,505 A 9/1973 Callanan
3,806,146 A * 4/1974 Shaw ..... B62B 3/106 248/129
4,031,689 A 6/1977 Sullivan
4,199,122 A * 4/1980 Christie ..... B65B 67/1227 248/97
4,241,561 A * 12/1980 Suominen ..... A47F 13/085 53/384.1
4,458,867 A * 7/1984 Malik ..... B65B 67/1205 248/97
4,487,388 A * 12/1984 Provan ..... B65B 67/1227 211/50
4,623,111 A * 11/1986 Prader ..... B65B 67/1227 220/495.01
4,723,743 A 2/1988 Jenkins
4,730,799 A 3/1988 Foss et al.
4,750,694 A * 6/1988 Bateman ..... B65B 67/1266 248/175
4,821,985 A * 4/1989 DeMatteis ..... A47F 13/085 211/12
4,830,317 A * 5/1989 Kober ..... B65B 43/26 221/36
4,840,336 A 6/1989 Stroh et al.
4,846,586 A 7/1989 Bruno
4,915,248 A 4/1990 Chap
4,926,748 A 5/1990 Smith et al.
5,018,691 A 5/1991 King
5,100,000 A * 3/1992 Huseman ..... B65D 33/2508 206/554
5,169,101 A * 12/1992 Wenzel ..... B65B 67/1227 248/95
D332,333 S 1/1993 Wenzel et al.
5,213,145 A * 5/1993 Huang ..... A47F 13/085 141/314
5,465,846 A * 11/1995 Blyth ..... A47F 13/085 206/554
5,469,969 A * 11/1995 Huang ..... A47F 13/085 206/554
5,682,730 A 11/1997 Dobreski
5,788,080 A 8/1998 Sill et al.
6,042,063 A 3/2000 Kerr et al.
6,536,951 B1 3/2003 Sill
7,066,389 B2 6/2006 Dickover et al.
7,175,139 B2 2/2007 Broeders
D553,320 S 10/2007 Rosen et al.
7,611,019 B2 11/2009 Alvarado
7,926,669 B2 4/2011 Alvarado
9,415,886 B2 * 8/2016 Sill et al. ..... B65B 5/045
2005/0105832 A1 5/2005 Trinko et al.
2006/0175475 A1 * 8/2006 Desantis ..... B65B 67/12 248/99
2006/0204148 A1 * 9/2006 Kohn ..... A47F 9/042 383/9
2007/0176058 A1 8/2007 Kohn et al.
2007/0186515 A1 8/2007 Ruetten et al.
2009/0261050 A1 10/2009 Curren
2010/0067831 A1 * 3/2010 Alvarado ..... A47F 13/085 383/37
2011/0108499 A1 * 5/2011 So ..... B65B 67/1227 211/59.1
2011/0180496 A1 7/2011 Hernberg et al.
2012/0080565 A1 4/2012 Gallup
2012/0125970 A1 5/2012 Tsui
2013/0223766 A1 8/2013 Gebhardt
2013/0330163 A1 12/2013 Marsh
2014/0263121 A1 9/2014 Metcalfe et al.
2014/0318085 A1 10/2014 Sill et al.
2015/0048039 A1 2/2015 Laitila et al.
2015/0128535 A1 5/2015 McInnis

* cited by examiner

BAG RACK AND DISPENSING SYSTEM AND METHOD FOR PACKAGING AND DISPENSING ITEMS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION

This application is a continuation of and claims priority to U.S. patent application Ser. No. 13/870,258, entitled "Bag Rack and Dispensing System and Method for Packaging and Dispensing Items," filed on Apr. 25, 2013 the entire disclosure of which is incorporated herein by reference.

TECHNICAL FIELD

The present invention relates generally to packaging and more particularly to a bag rack and dispensing system and method for packaging and dispensing food items.

BACKGROUND

In, for example, a grocery or food deli application in which food is preprocessed, precooked, or otherwise prepared sale, there may be certain inefficiencies in packaging the prepared food items. For example, for a somewhat large food item, such as a precooked rotisserie chicken, it may be difficult for one person to hold open a storage bag and at the same time load the food item into the bag. Consequently, it may require two people to package the food item; namely, one person to hold open the storage bag while another person places the food item in the bag. Therefore, more efficient approaches are needed packaging food items that are preprocessed, precooked, or otherwise prepared sale.

SUMMARY

In one aspect a bag rack and dispensing system is provided. The bag rack and dispensing system may include a rack, the rack may include, a base assembly and a hanger assembly mounted to the base assembly; and a plurality of storage bags removably engaged with the hanger assembly. The system may further include a hooking device, wherein the hooking device may include a bar with a hook formed at one or both ends thereof and configured to assist in holding open at least one of the plurality of storage bags. The hooking device may be coupled to the base assembly, in either a permanent or removable fashion. The base assembly may include side bars and crossbars and the side bars and crossbars may be arranged to form a substantially boxed-shaped structure. The side bars may be arranged substantially parallel with one another and the crossbars may be arranged substantially parallel with one another and the side bars may be arranged substantially perpendicular with the crossbars. The base assembly may include two side bars and three crossbars, wherein the three crossbars may span a distance spaced between the two side bars. The one or more of the crossbars may be arranged to support the hanger assembly, wherein the hanger assembly may be affixed to one or more of the crossbars. The hanger assembly may include hanger bars and one or more hanger crossbars. The hanger bars may be arranged substantially parallel with one another. The two or more hanger bars each may include a multi-segmented rod. One segment at a proximal end of each of the hanger bars may be configured to engage with the base assembly to support the hanger bars thereon, and wherein another segment at a distil end of each of the hanger bars may be configured to engage with the plurality of storage bags to support the plurality of storage bags thereon. The plurality of storage bags may include a top portion and a detachable bottom portion, wherein the top portion may include an engagement mechanism for engaging with the hanger assembly, and the detachable bottom portion may include a storage pouch and a resealable opening providing access to the storage pouch. The engagement mechanism for engaging with the hanger assembly may include holes for engaging hanger bars of the hanger assembly. The bottom portion may be detachable from the top portion by a perforation spanning a bottom edge of the top portion. The storage bags may further include a handle. The plurality of storage bags may be bound together at the top portion. The plurality of storage bags may be bound together at the top portion via grommets. The plurality of storage bags may be configured to store food items.

In another aspect a method of packaging and dispensing items, using a bag rack dispensing system is provided. The method may include, hanging a plurality of storage bags on a rack, the rack comprising, a base assembly and a hanger assembly; opening a frontmost storage bag of the plurality of storage bags via a resealable opening; holding open a front edge of the resealable opening at the frontmost storage bag; placing an item to be stored into the opened frontmost storage bag; resealing the resealable opening of the frontmost storage bag with the item placed therein; and removing the frontmost storage back from the plurality of storage bags and the rack.

BRIEF DESCRIPTION OF THE DRAWINGS

The features and advantages of the present invention will be more clearly understood from the following description taken in conjunction with the accompanying drawings, wherein.

DETAILED DESCRIPTION

Figure 1:
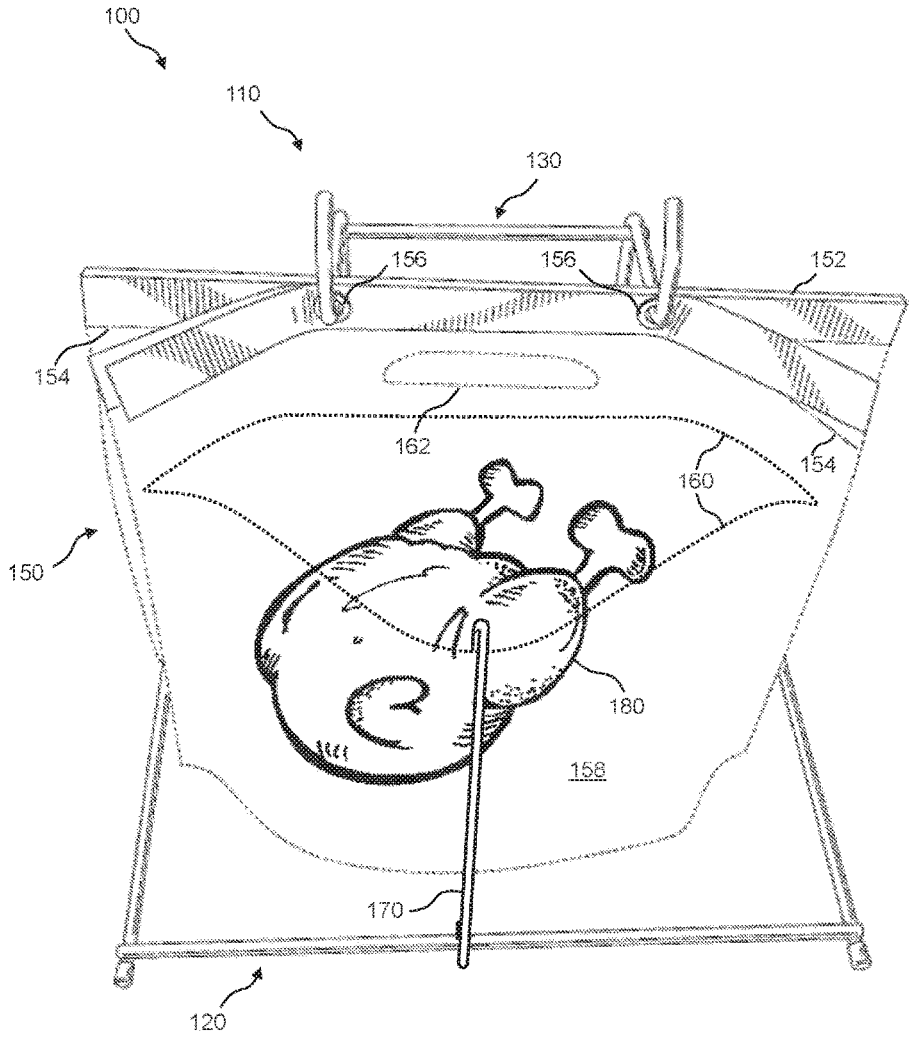
FIG. 1 illustrates a front perspective view of an example of a bag rack and dispensing system.
Figure 2:
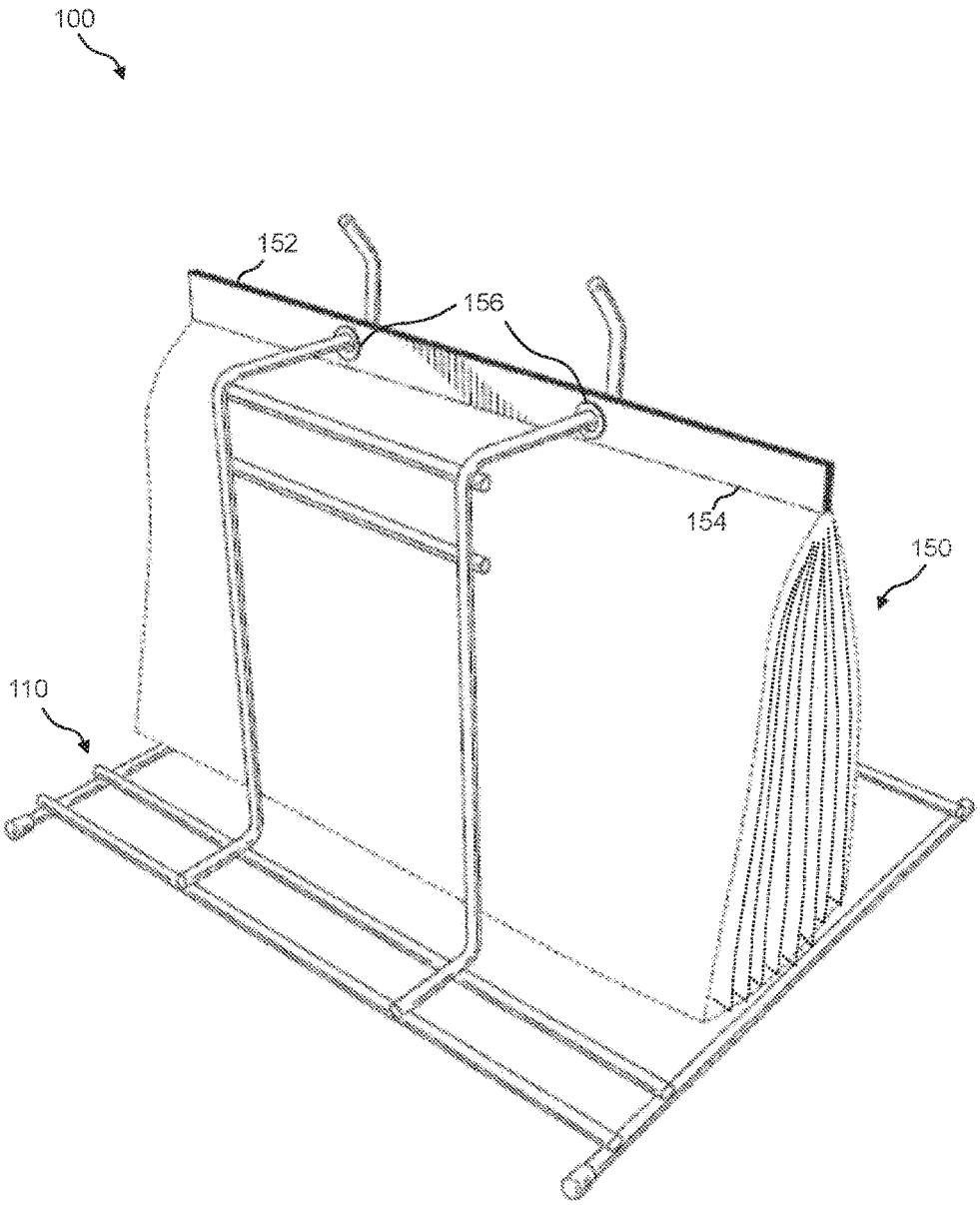
FIG. 2, FIG. 3, and FIG. 4 illustrate a rear perspective view, a front view, and a side view, respectively, of the bag rack and dispensing system.
Figure 3:
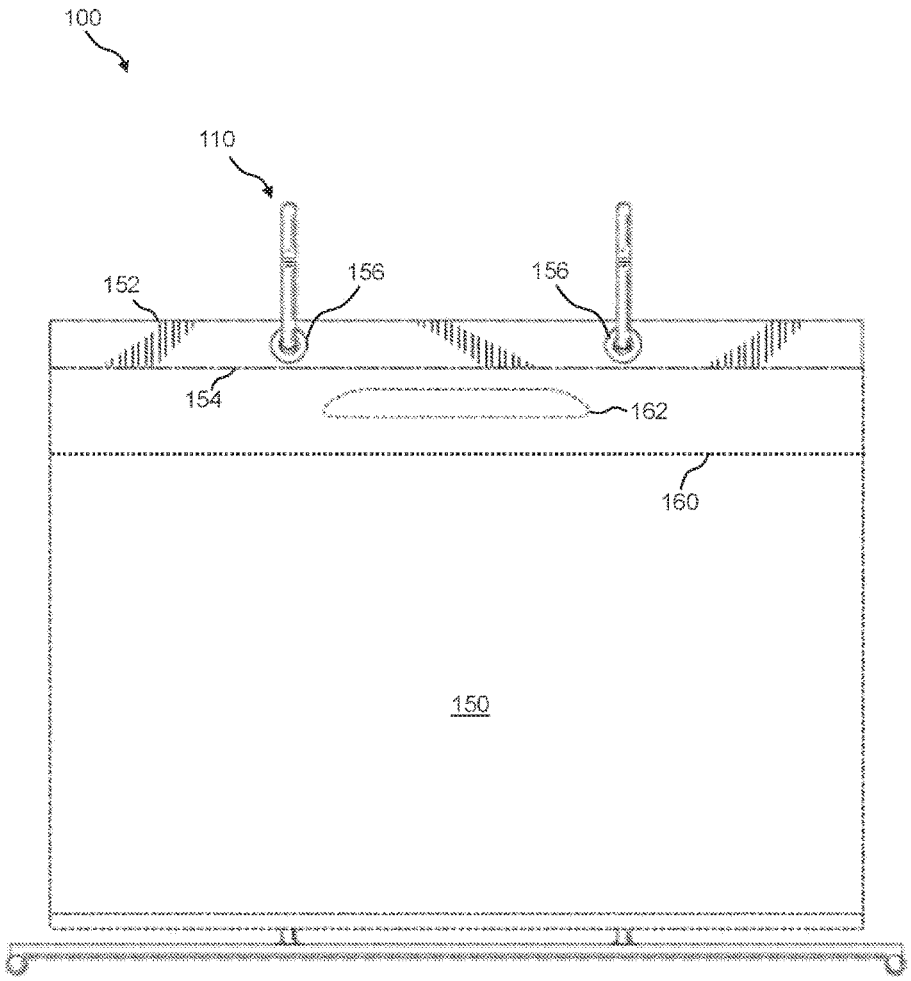
Figure 4:
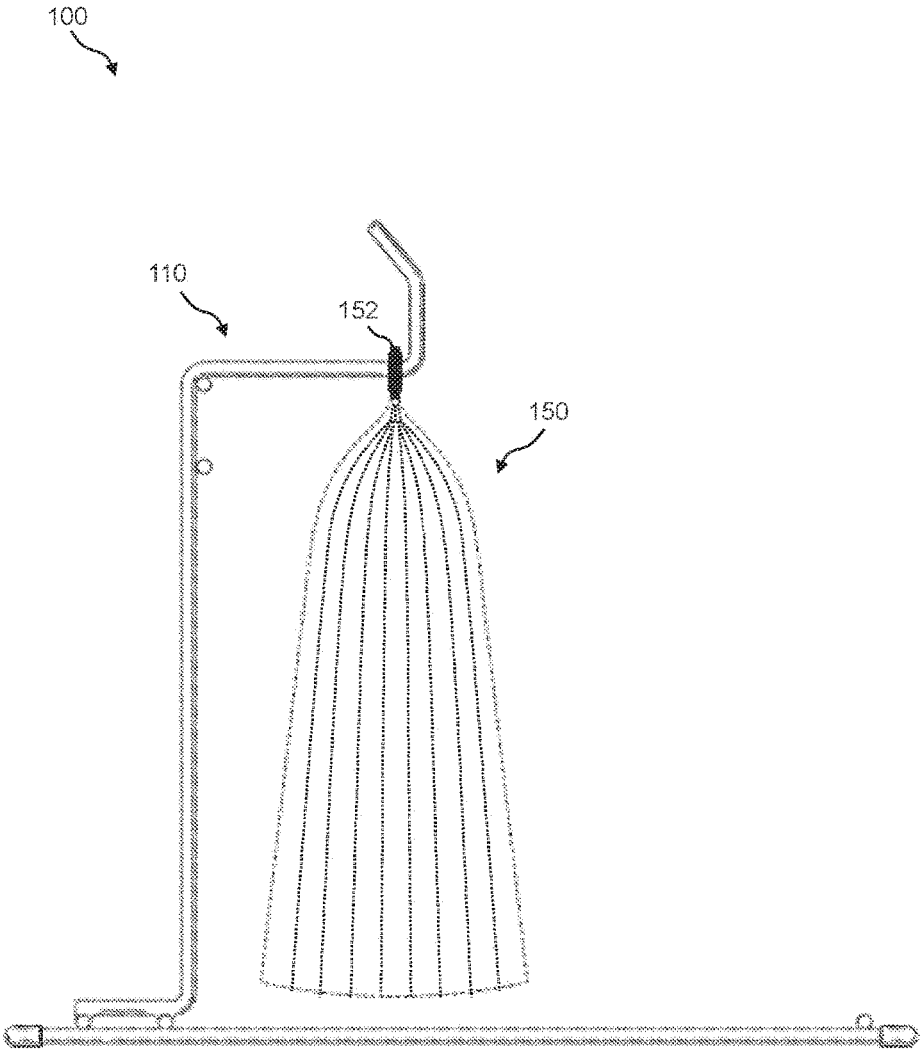

A bag rack and dispensing system and method for packaging and dispensing items, such as food, is provided. The bag rack and dispensing system includes a rack for holding multiple storage bags in preparation for packaging items, such as food, therein. Namely, in using the bag rack and dispensing system, the storage frontmost bag can be held open in a manner that is convenient of packing food items therein. Once packed, the frontmost storage bag is sealed and then easily removed from the rack, exposing the next storage bag to be packed. Further, the bag rack and dispensing system allows the storage bag to be easily packed by one person, whereas conventional methods may require one person to hold open the storage bag while a second person places the food items in the bag.

While the bag rack and dispensing system and method are described herein below in the context of packaging food items, the invention is not limited to packaging food items only. The bag rack and dispensing system and method can be used for packaging any types of items.

FIG. 1, FIG. 2, FIG. 3, and FIG. 4 illustrate a front perspective view, a rear perspective view, a front view, and a side view, respectively, of a bag rack and dispensing system 100 for packaging and dispensing food items. In this example, bag rack and dispensing system 100 includes a rack 110 that is formed of a base assembly 120 and a hanger assembly 130 . Namely, hanger assembly 130 is mounted atop base assembly 120 . More details of rack 110 are described with reference to FIG. 5 through FIG. 9. Bag rack and dispensing system 100 may also include a set of storage bags 150 that can be hung on hanger assembly 130 of rack 110 in preparation for packaging food items therein. Storage bags 150 may, for example, be plastic resealable storage bags.

In one example, multiple storage bags 150 may be provided as a single unit in a bound fashion. For example, the top portion 152 of multiple storage bags 150 may be gathered together and bound via grommets 156. A perforation 154 is provided in each of the storage bags at a bottom edge of top portion 152, which allows each of the storage bags 150 to be removed from top portion 152 individually. Top portion 152 may include, for example, two holes that are reinforced with grommets 156, wherein grommets 156 of top portion 152 can be slid onto hanger assembly 130 of rack 110, as shown.

Each of the storage bags 150 includes a storage pouch 158 for holding, for example, food items. A resealable opening 160 in each of the storage bags 150 provides access to storage pouch 158. In one example, resealable opening 160 is a Ziploc® type of resealable opening. By way of example, FIG. 1 shows a food item 180 (e.g., a rotisserie chicken) inside storage pouch 158 of the frontmost storage bag 150. Each of the storage bags 150 also may include a carry handle 162 for carrying storage bag 150 once torn away from top portion 152 and removed from bag rack and dispensing system 100.

Bag rack and dispensing system 100 may optionally include a hooking device 170 for holding the frontmost storage bag 150 open in a manner that is convenient of packing food items therein. More details of hooking device 170 are described with reference to FIG. 10. Once packed, hooking device 170 is removed from the frontmost storage bag 150. Then, the frontmost storage bag 150 is sealed and easily removed from hanger assembly 130 of rack 110, exposing the next storage bag 150 to be packed. Base assembly 120 of rack 110 is designed to safely balance storage bags 150 during the packaging process.

The physical size of rack 110 of bag rack and dispensing system 100 can be scaled to handle storage bags 150 of any capacity (by volume or weight). In one example, rack 110 can be sized to handle 2-quart capacity storage bags 150. In another example, rack 110 can be sized to handle 1-gallon capacity storage bags 150, and so on. Additionally, the size of hooking device 170 can be scaled accordingly.

Figure 5:
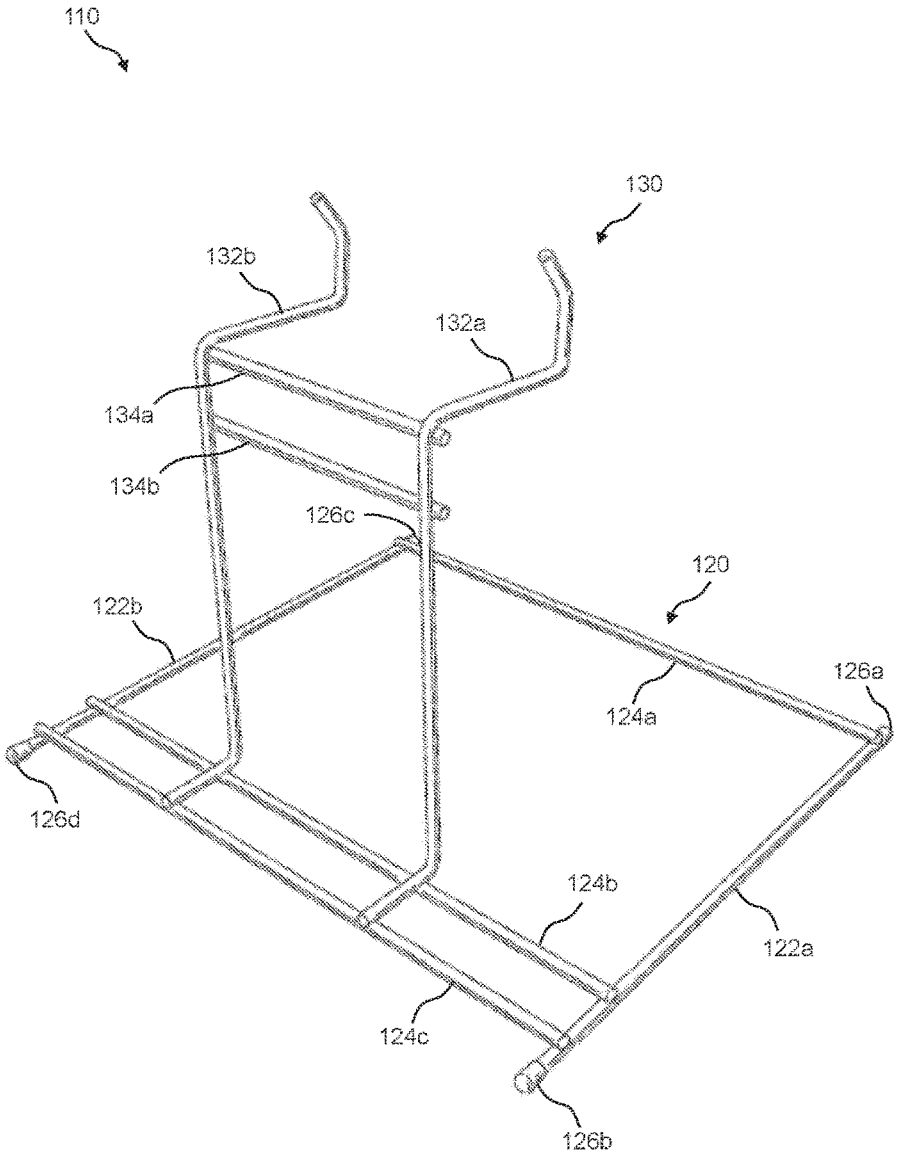
FIG. 5, FIG. 6, FIG. 7, and FIG. 8 illustrate a rear perspective view, a side view, a front view, and a top down view, respectively, of a rack of the bag rack and dispensing system.
Figure 6:
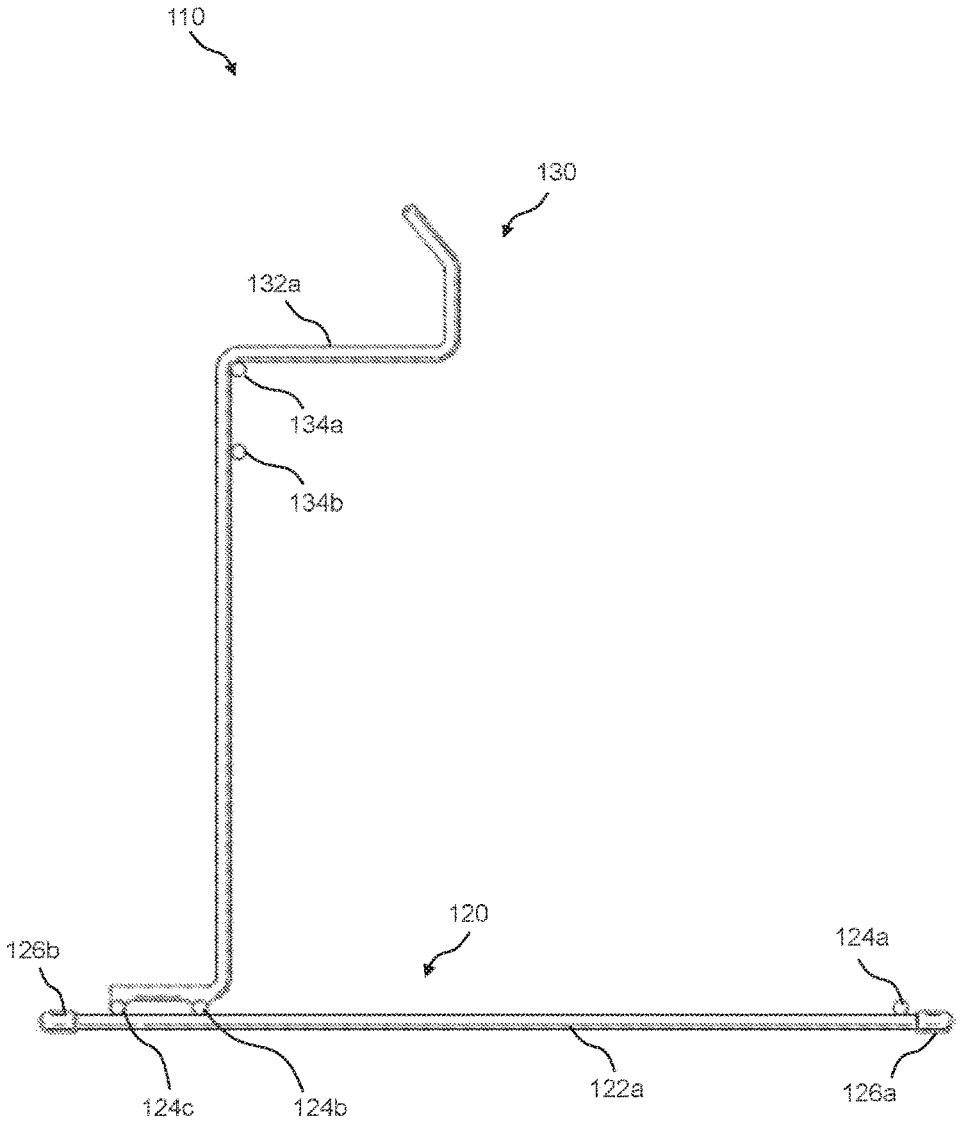
Figure 7:
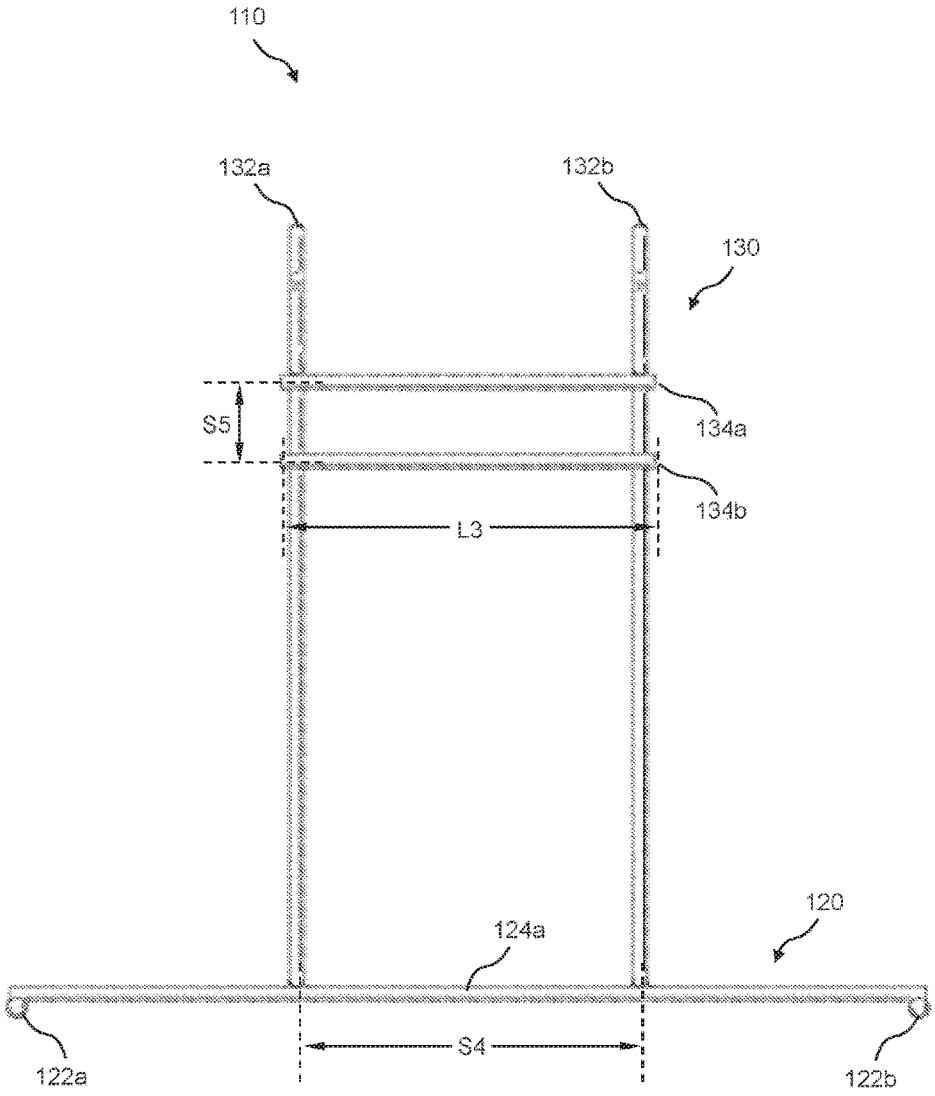
Figure 8:
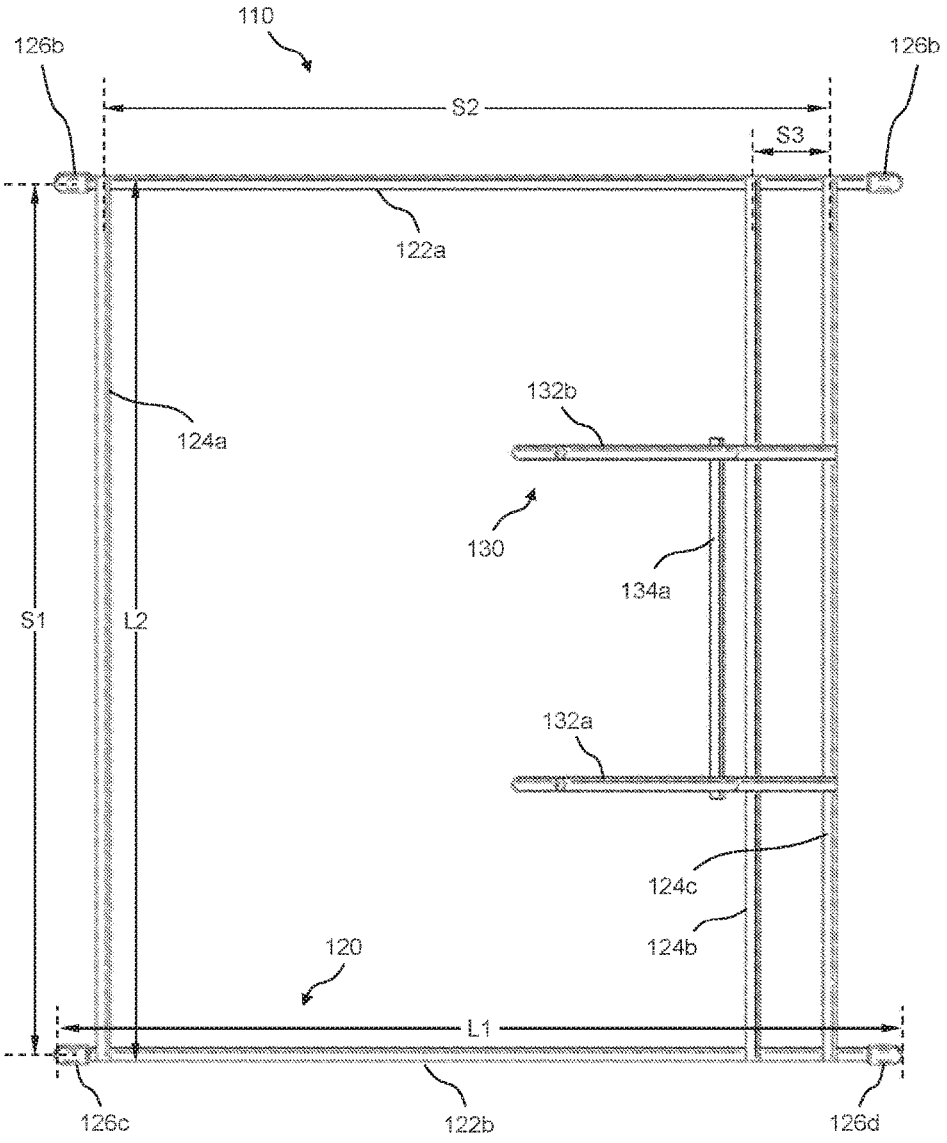

FIG. 5 through FIG. 8 show more details of rack 110 of bag rack and dispensing system 100 shown in FIG. 1 through FIG. 4. Namely, FIG. 5 illustrates a rear perspective view of rack 110, FIG. 6 illustrates a side view of rack 110, FIG. 7 illustrates a front view of rack 110, and FIG. 8 illustrates a top down view of rack 110.

Referring to FIG. 5 through FIG. 8, base assembly 120 of rack 110 includes a pair of side bars 122 and multiple crossbars 124. For example, base assembly 120 includes a side bar 122a and a side bar 122b, which are arranged substantially parallel to each other. Spanning side bars 122a and 122b are, for example, three crossbars 124 (e.g., crossbars 124a, 124b, and 124c), as shown. In particular, the combination of side bars 122a and 122b and crossbars 124a and 124c form a substantially boxed-shaped base assembly 120. Crossbar 124b is preferably provided in combination with crossbar 124c for support of hanger assembly 130. Namely, hanger assembly 130 may be affixed to crossbars 124b and 124c, as shown. Referring to FIG. 8, side bars 122a and 122b have an on-center spacing S1, crossbars 124a and 124c have an on-center spacing S2 , and crossbars 124b and 124c have an on-center spacing S2 . Additionally, side bars 122 have a length L1 and crossbars 124 have a length L2.

Further, a set of plastic or rubber caps 126 may be installed on the ends of side bars 122. For example, caps 126a and 126b may be installed on the ends of side bar 122a. Caps 126c and 126d may be installed on the ends of side bar 122b. The caps 126 are provided for aesthetic purposes, as well as to protect the user from any roughness at the ends of side bars 122.

Hanger assembly 130 of rack 110 is arranged substantially orthogonal with respect to base assembly 120 of rack 110, as shown. Referring again to FIG. 5 through FIG. 8, hanger assembly 130 of rack 110 includes a pair of hanger bars 132 and one or more hanger crossbars 134. For example, hanger assembly 130 may include a hanger bar 132a and a hanger bar 132b, which may be arranged substantially parallel to each other. Spanning hanger bars 132a and 132b may, for example, be two hanger crossbars 134 (e.g., hanger crossbars 134a and 134b), as shown. Referring to FIG. 7, hanger bars 132a and 132b have an on-center spacing S4 and hanger crossbars 134a and 134c have an on-center spacing S5 . Additionally, hanger crossbars 134 have a length L3.

Side bars 122 and crossbars 124 of base assembly 120, as well as hanger bars 132 and hanger crossbars 134 of hanger assembly 130 are preferably rigid rods that can be formed of any material that is suitably strong to support storage bags 150 and any content thereof. The cross-sectional diameters of the rods can vary depending on the material. In one example, side bars 122 and crossbars 124 of base assembly 120 and hanger bars 132 and hanger crossbars 134 of hanger assembly 130 may be metal rods, such as stainless steel or aluminum rods. In another example, side bars 122 and crossbars 124 of base assembly 120 and hanger bars 132 and hanger crossbars 134 of hanger assembly 130 may be plastic rods.

Figure 9:
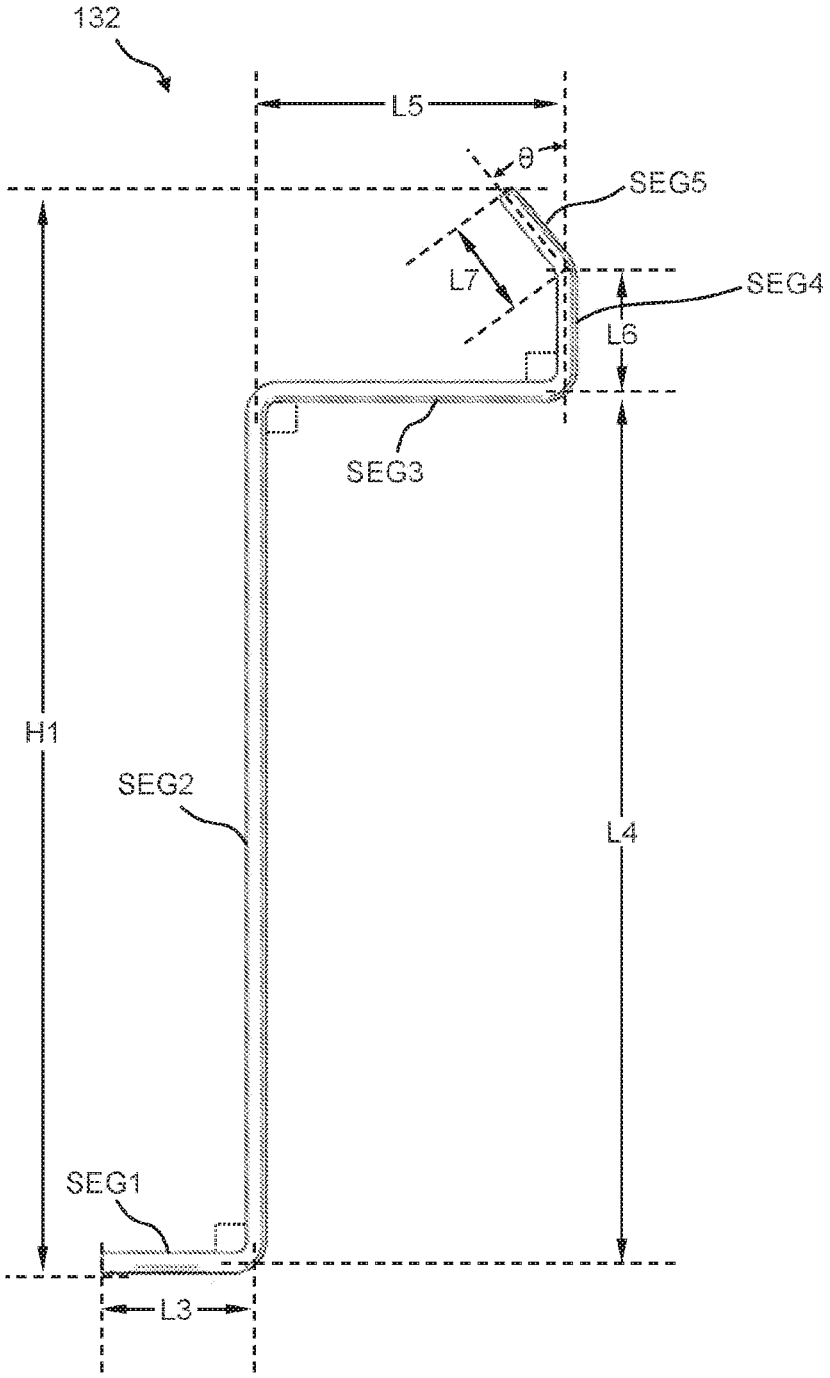
FIG. 9 illustrates a side view of the hanger bar portion of the rack of the bag rack and dispensing system.

More details of hanger bars 132 are now described with reference to FIG. 9, which illustrates a side view of one hanger bar 132 of hanger assembly 130 of rack 110. For example, each hanger bar 132 is a rod that may include multiple segments, for example, five segments. Namely, each hanger bar 132 may be formed, in order, of segments SEG1, SEG2, SEG3, SEG4, and SEG5. For example, segment SEG1 may be designed to be mounted across and upon crossbars 124b and 124c of base assembly 120 of rack 110. Segment SEG1 has a length L3 . Next, segment SEG2 continues substantially orthogonal from one end of segment SEG1, as shown. Segment SEG2 has a length L4 . Next, segment SEG3 continues substantially orthogonal from the other end of segment SEG2, as shown. Segment SEG3 is substantially parallel to segment SEG1. Segment SEG3 has a length L5. Next, segment SEG4 continues substantially orthogonal from the other end of segment SEG3, as shown. Segment SEG4 is substantially parallel to segment SEG2. Segment SEG4 has a length L6 . Next, segment SEG5 continues at an angle θ from the other end of segment SEG4, as shown. Segment SEG5 has a length L7. Additionally, each hanger bar 132 has an overall height H1. While the above example is illustrated as having five segments, it is contemplated that each hanger bar 132 may have more or less segments, and the above is just an example of one embodiment.

In rack 110, segments SEG1 of hanger bars 132a and 132b of hanger assembly 130 are affixed to crossbars 124b and 124c of base assembly 120. For example, hanger assembly 130 can be affixed to base assembly 120 via welding, adhesive (e.g., epoxy adhesive), or other suitable means.

Further and referring now to FIG. 1 through FIG. 9, side bars 122 and crossbars 124 of base assembly 120 of rack 110, as well as hanger bars 132 and hanger crossbars 134 of hanger assembly 130 of rack 110 have a cross-sectional diameter D1. The cross-sectional diameter D1 of all of these components can be the same or can be different. Further, the cross-sectional diameter D1 can vary depending on the type of material of which side bars 122 and crossbars 124 of base assembly 120 and hanger bars 132 and hanger crossbars 134 of hanger assembly 130 are formed.

Figure 10:
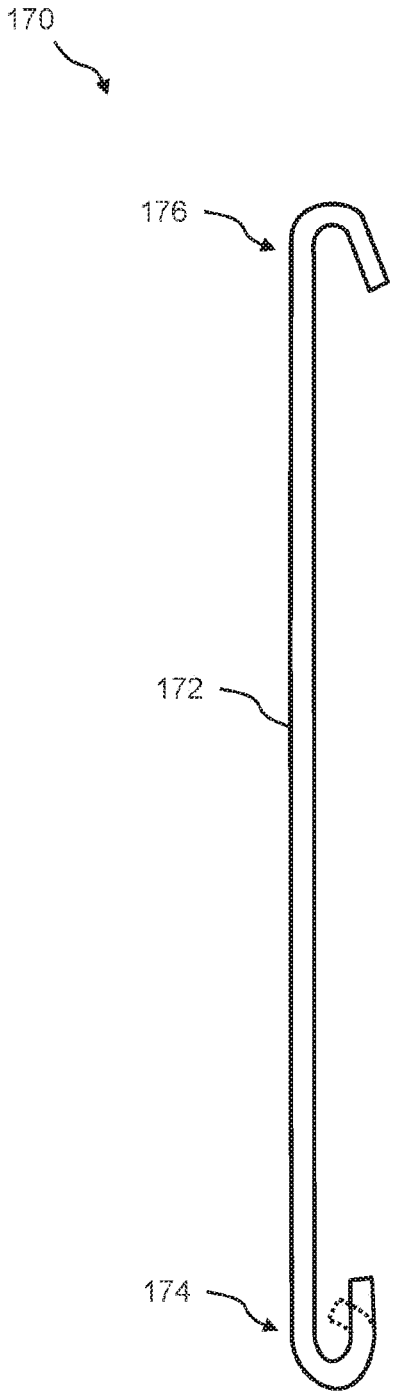
FIG. 10 illustrates a side view of a hooking device of the bag rack and dispensing system.

FIG. 10 illustrates a side view of optional hooking device 170 of bag rack and dispensing system 100. Hooking device 170 is preferably a bar with hooks on one or both ends. Hooking device 170 can be formed, for example, of metal, plastic, or other suitable material. For example, hooking device 170 includes a bar 172 that has a hook 174 at one end and a hook 176 at the opposite end, as shown. Bar 172 may have a cross-sectional diameter D2. Hook 174 of hooking device 170 is designed to engage crossbar 124a of base assembly 120 of rack 110 , while hook 176 is designed to hook onto the edge of resealable opening 160 of storage bags 150, as shown in FIG. 1. Hook 174 may be formed by bending bar 172 back on itself. In one example, hook 174 is open enough to engage with crossbar 124a when in use, and then disengage from crossbar 124a when not in use. In another example, hook 174 wraps around crossbar 124a in a manner that hooking device 170 is permanently coupled to crossbar 124a in a sliding (side-to-side) and pivoting fashion. The inside bend radius of hook 174 is slightly greater than cross-sectional diameter D1 of crossbar 124a. Hook 176 may be formed by bending bar 172 back on itself. Hook 176 is preferably set at an angle sufficient for easily engaging with the edge of resealable opening 160 of a storage bag 150.

Table 1 below shows example specifications of rack 110 of bag rack and dispensing system 100. Note the dimensions listed in Table 1 below are non-limiting examples only, and other dimensions are contemplated and within the scope of the invention.

| Specification | Example |
|---|---|
| Spacing S1 of side bars 122a and 122b | in the range of about 13 inches |
| Spacing S2 of crossbars 124a and 124c | in the range of about 10¾ inches |

-continued

| Specification | Example |
|---|---|
| Spacing S3 of crossbars 124b and 124c | in the range of about 1¼ inches |
| Spacing S4 of hanger bars 132a and 132b | in the range of about 5 inches |
| Spacing S5 of hanger crossbars 134a and 134c | in the range of about 1 inch |
| Length L1 of side bars 122 | in the range of about 12½ inches |
| Length L2 of crossbars 124 | in the range of about 13¼ inches |
| Length L3 of segment SEG1 of hanger bar 132 | in the range of about 2 inches |
| Length L4 of segment SEG2 of hanger bar 132 | in the range of about 9 inches |
| Length 15 of segment SEQ3 of hanger bar 132 | in the range of about 3¼ inches |
| Length L6 of segment SEG4 of hanger bar 132 | in the range of about 1 inch |
| Length L7 of segment SEG5 of hanger bar 132 | in the range of about 1 inch |
| Height H1 of segment SEQ5 of hanger bar 132 | in the range of about 10¾ inches |
| Angle θ of hanger bar 132 | in the range of about 45° degrees |
| Cross-sectional diameter D1 | in the range of about ¼ inches |

Figure 11:
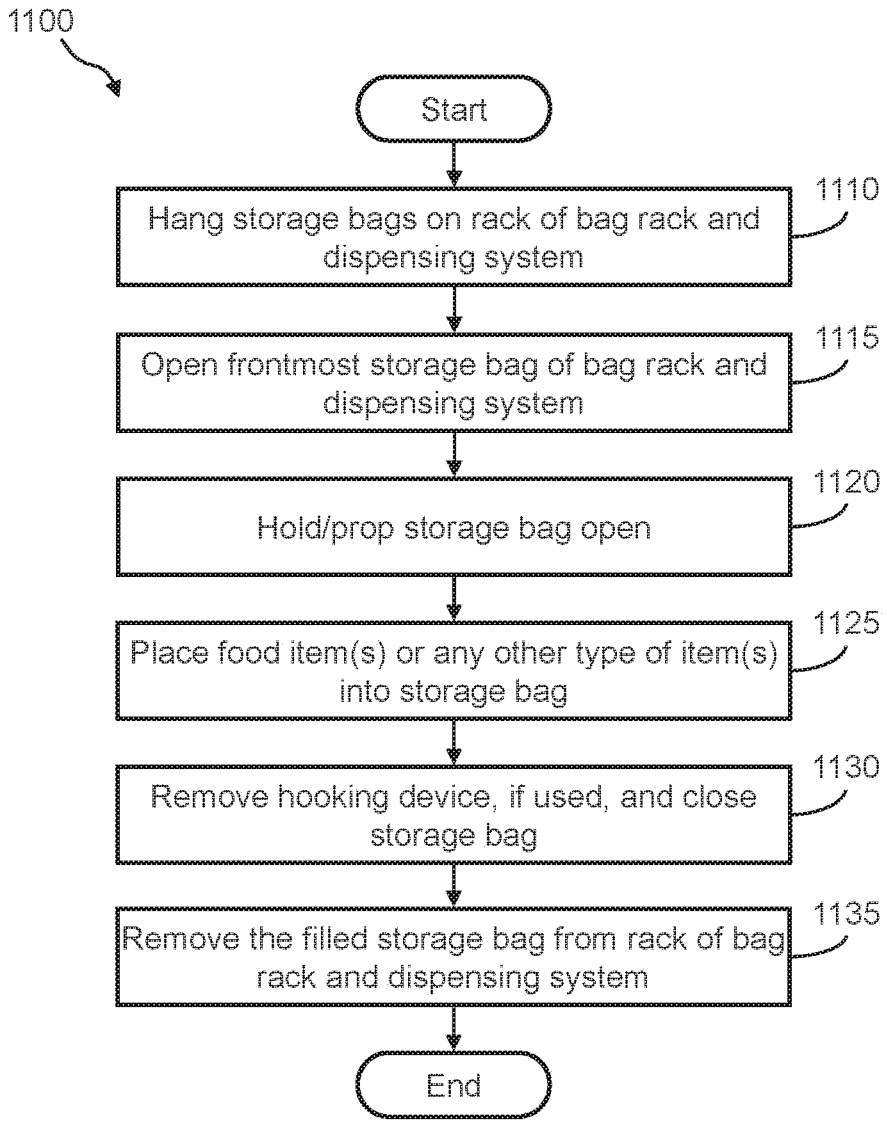
FIG. 11 illustrates a flow diagram of an example of a method of using the bag rack and dispensing system.

FIG. 11 illustrates a flow diagram of an example of a method 1100 of using bag rack and dispensing system 100 for packaging and dispensing food items. Method 1100 includes, but is not limited to, the following steps.

At a step 1110, one or more storage bags 150 are hung on rack 110 of bag rack and dispensing system 100. For example, one or more storage bags 150 are hung on rack 110 of bag rack and dispensing system 100 by sliding the grommets 156 onto the hanger bars 132 of hanger assembly 130 of rack 110.

At a step 1115, the frontmost storage bag 150 of bag rack and dispensing system 100 is opened. For example, the user opens resealable opening 160 of the frontmost storage bag 150.

At a step 1120, the storage bag 150 is held open by hand or propped open using hooking device 170. For example, hook 174 of hooking device 170 is engaged with crossbar 124a. Then, the edge of resealable opening 160 is pulled forward and hook 176 is engaged with the front edge of resealable opening 160, as shown in FIG. 1.

At a step 1125, food item(s) or any other types of item(s) are placed into storage bag 150. The placement of the item(s) into storage bag 150 is made easy because by pulling the edge of resealable opening 160 forward the design of rack 110, in particular the location of the holes with grommets 156 and hanger bars 132, the outer edges of top portion 152 are allowed to bend forward as the edge of resealable opening 160 is pulled forward, allowing for a wider opening and greater access to storage pouch 158 of storage bags 150, thus making loading storage bag 150 easier and more efficient. Loading storage bag 150 may also be facilitated by holding the resealable opening 160 wide open via optional hooking device 170.

At a step 1130, if used, hooking device 170 may be removed from engagement with resealable opening 160 of storage bag 150. Then, resealable opening 160 of storage bag 150 is closed, thereby securing the contents of storage bag 150.

At a step 1135, the filled storage bag 150 is removed from rack 110 of bag, rack and dispensing system 100. Namely, via perforation 154 in the filled storage bag 150, the user tears the filled storage bag 150 away from top portion 152. In so doing, the filled storage bag 150 is removed from rack 110.

Referring again to FIG. 1 through FIG. 11, an example application for using bag rack and dispensing system 100 and method 1100 is a grocery store deli or any food deli. For example, in the grocery store deli, multiple rotisserie chickens are being cooked and prepared for sale. In this example, multiple bag rack and dispensing systems 100 may be set up with the frontmost storage bag 150 propped open in a similar manner as described in step 1120 of method 1100. Once the multiple rotisserie chickens are finished cooking, one at a time, the cooked rotisserie chickens can be dropped or placed into the storage bags 150 of successive bag rack and dispensing systems 100. The storage bags 150 are then closed and removed from rack 110 and the rotisserie chickens (in the storage bags 150) are placed on display for sale. During the next cooking cycle, the multiple bag rack and dispensing systems 100 can be readied for filling another set of storage bags 150. Further, bag rack and dispensing system 100 and method 1100 allow the storage bags 150 to be easily packed by one person, whereas conventional methods may require one person to hold open the storage bag while a second person places the food items in the bag.

The foregoing detailed description of embodiments refers to the accompanying drawings, which illustrate specific embodiments of the invention. Other embodiments having different structures and operations do not depart from the scope of the present invention. The term "the invention" or the like is used with reference to certain specific examples of the many alternative aspects or embodiments of the applicant's invention set forth in this specification, and neither its use nor its absence is intended to limit the scope of the applicant's invention or the scope of the claims. This specification is divided into sections for the convenience of the reader only. Headings should not be construed as limiting of the scope of the invention. It will be understood that various details of the present invention may be changed without departing from the scope of the present invention. Furthermore, the foregoing description is for the purpose of illustration only, and not for the purpose of limitation, as the present invention is defined by the claims as set forth hereinafter. The various dimensions and measurements referred to herein and the drawings are merely exemplarily and should not limit the present invention, as varying dimensions and measurements are contemplated by the invention and one of skill in the art would recognize so.

What is claimed is:

1. A bag rack and dispensing system, comprising:

a. a base assembly comprising one or more side bars and one or more crossbars coupled to the side bar, wherein at least one of the one or more crossbars is located at a front portion of the base assembly; and b. a hanger assembly mounted to the base assembly, the hanger assembly comprising *a pair of opposing* hanger bars, *each of the opposing hanger bars* comprising:

i. a first portion *having a proximal end and a distal end, the first portion* coupled to one or more of the one or more crossbars to support the hanger assembly on the base assembly;

ii. a second portion extending at is proximal end from the *distal end of the* first portion in a generally vertical direction;

iii. a third portion extending at its proximal end from a distal end of the second portion in a generally horizontal direction *and in an opposite direction of that of the proximal end of the first portion*; and iv. a fourth portion extending at its proximal end from a distal end of the third portion in a generally vertical direction; and wherein, the *pair of opposing* hanger bars are configured to support a plurality of storage bags in a removable manner thereon, *and wherein the respective first portion, second portion, third portion, and fourth portion of each of the hanger bars are substantially coplanar*.

2. The system of claim 1 further comprising a hooking device, wherein the hooking device comprises a bar having a first end coupled to the at least one of the one or more crossbars located at the front portion of the base assembly and a second end configured to assist in holding open at least one of the plurality of storage bags.

3. The system of claim 2 wherein the bar of the hooking device comprises a hook formed on at least one of the first end and second end.

4. The system of claim 1 wherein the base assembly is configured to form a substantially boxed-shaped structure.

5. The system of claim 4 wherein the side bars are arranged substantially parallel with one another and the crossbars are arranged substantially parallel with one another and wherein the side bars are arranged substantially perpendicular with the crossbars.

6. The system of claim 4 wherein the base assembly comprises two of the side bars and three of the crossbars, wherein the three crossbars span a distance spaced between the two side bars.

7. The system of claim 1 wherein the hanger assembly further comprises one or more hanger crossbars coupled to the hanger bars, wherein the hanger bars are spaced apart a distance substantially equal to a length of the one or more hanger crossbars.

8. The system of claim 1 wherein the hanger bars are arranged substantially parallel with one another.

9. The system of claim 1 wherein the fourth portion of the hanger bars further comprises an angled portion extending from a distal end of the fourth portion.

10. The system of claim 1 further comprising a plurality of storage bags, wherein each of the plurality of storage bags comprise a top portion and a detachable bottom portion, wherein the top portion comprises an engagement mechanism for engaging with the hanger assembly, and the detachable bottom portion comprises a storage pouch.

11. The system of claim 10 wherein the engagement mechanism for engaging with the hanger assembly comprises holes for engaging the hanger bars of the hanger assembly.

12. The system of claim 10 wherein the bottom portion is detachable from the top portion by a perforation spanning a bottom edge of the top portion.

13. The system of claim 10 wherein each of the plurality of storage bags further comprises a handle.

14. The system of claim 10 wherein the plurality of storage bags are bound together at the top portion.

15. The system of claim 14 wherein the plurality of storage bags are bound together at the top portion via grommets.

16. The system of claim 10 wherein the detachable bottom portion further comprises a resealable opening providing access to the storage pouch.

17. The system of claim [1] *10* wherein the plurality of storage bags are configured to store food items.

18. A method of packaging and dispensing items, using a bag rack dispensing system, the method comprising:

a. hanging a plurality of storage bags on a bag rack, the bag rack comprising:

i. a base assembly comprising one or more side bars and one or more crossbars configured in a horizontal plane to form a base assembly support structure, wherein at least one of the one or more crossbars is located at a front portion of the base assembly; and ii. a hanger assembly mounted to the base assembly, the hanger assembly comprising *a pair of opposing* hanger bars*, each of the opposing hanger bars* comprising:

1. a first portion *having a proximal end and a distal end, the first portion* coupled to one or more of the one or more crossbars;
2. a second portion extending at is proximal end from the first portion in a generally vertical direction;
3. a third portion extending at its proximal end from a distal end of the second portion in a generally horizontal direction *and in an opposite direction of that of the proximal end of the first portion*; and
4. a fourth portion extending at its proximal end from a distal end of the third portion in a generally vertical direction; and wherein, the *pair of opposing* hanger [assembly is] *bars are* configured to support a plurality of storage bags in a removable manner thereon*, and wherein the respective first portion, second portion, third portion, and fourth portion of each of the hanger bars are substantially coplanar*;

b. opening a frontmost storage bag of the plurality of storage bags via a resealable opening;

c. holding open a front edge of the resealable opening of the frontmost storage bag;

d. placing an item to be stored into the opened frontmost storage bag;

e. resealing the resealable opening of the frontmost storage bag with the item placed therein; and f. removing the frontmost storage back from the plurality of storage bags and the rack.

* * * * *